Dec. 4, 1956    J. CRAGGS ET AL    2,773,257
CONVEYOR HAVING FLEXIBLE STRAND SIDE FRAMES AND
TROUGHING ROLLER ASSEMBLY THEREFOR
Original Filed July 11, 1955    9 Sheets-Sheet 1
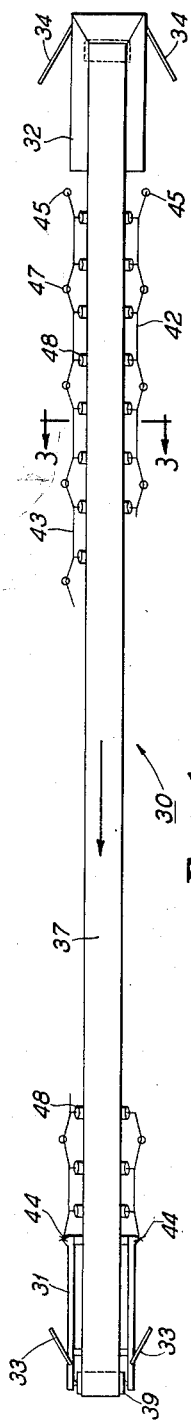
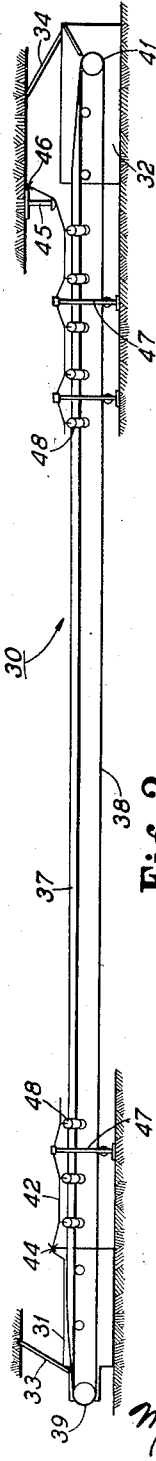
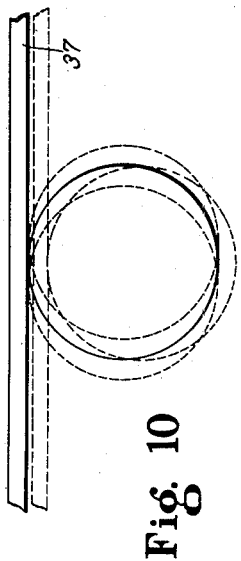
INVENTOR.
Joseph Craggs
Keith McCann
BY
Murray A. Gleeson
ATTORNEY

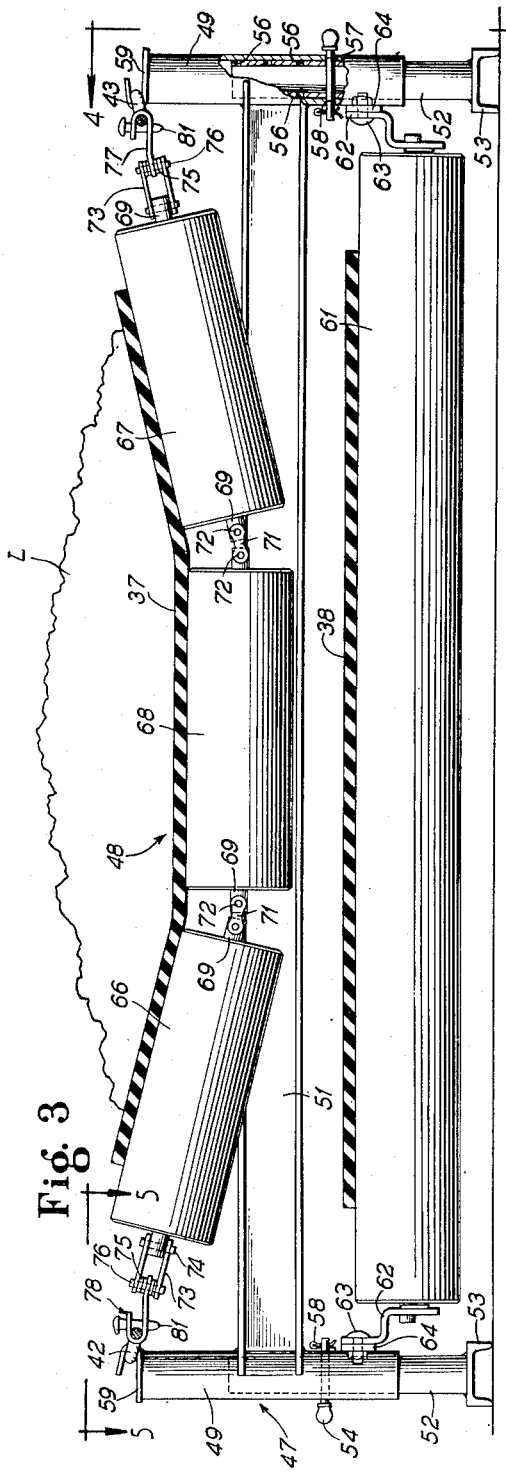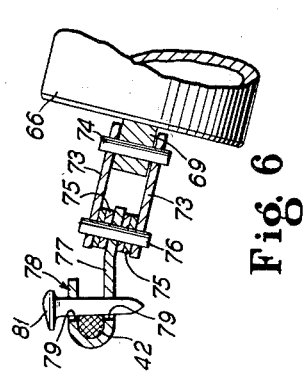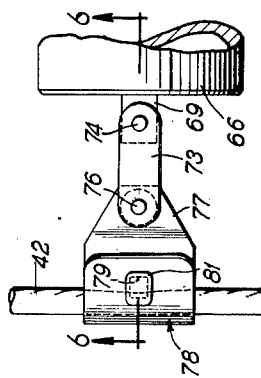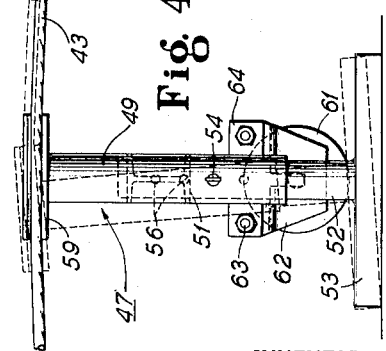
INVENTOR.
Joseph Craggs
Keith McCann
BY
Murray A. Gleeson
ATTORNEY

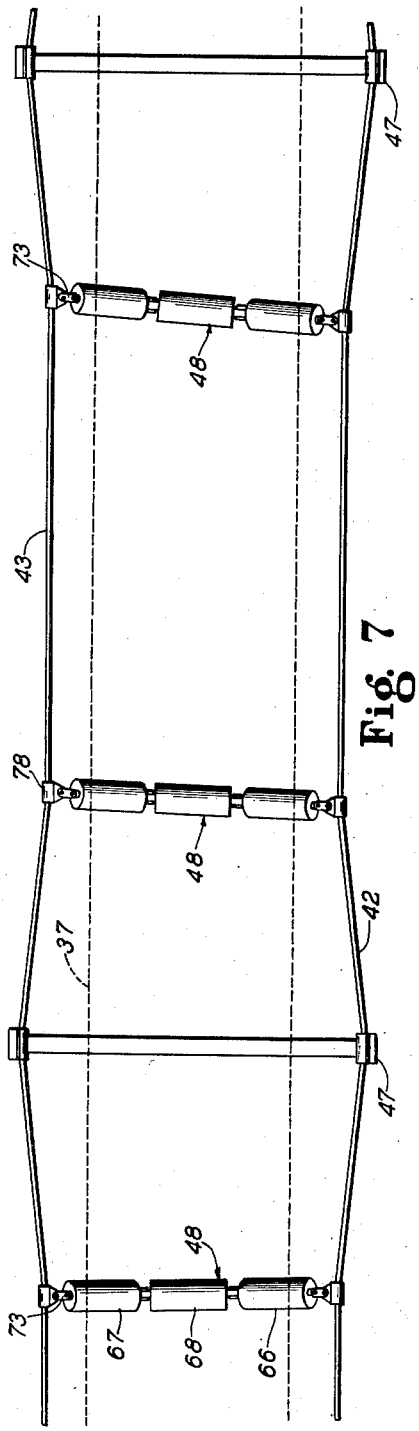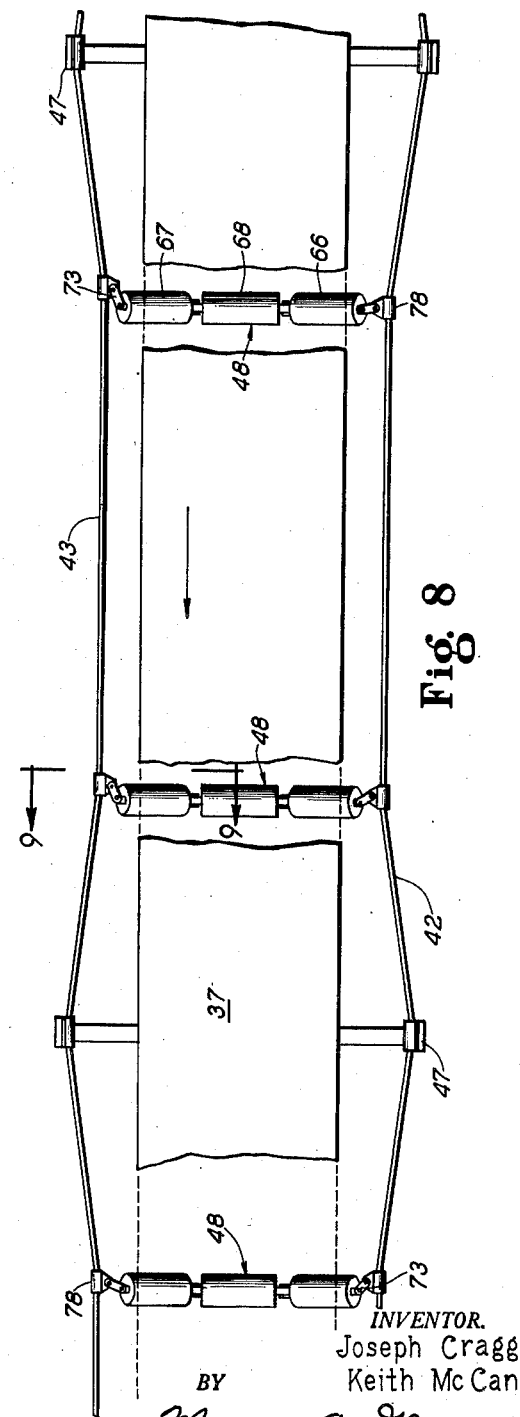

Dec. 4, 1956  J. CRAGGS ET AL  2,773,257
CONVEYOR HAVING FLEXIBLE STRAND SIDE FRAMES AND
TROUGHING ROLLER ASSEMBLY THEREFOR
Original Filed July 11, 1955  9 Sheets-Sheet 4
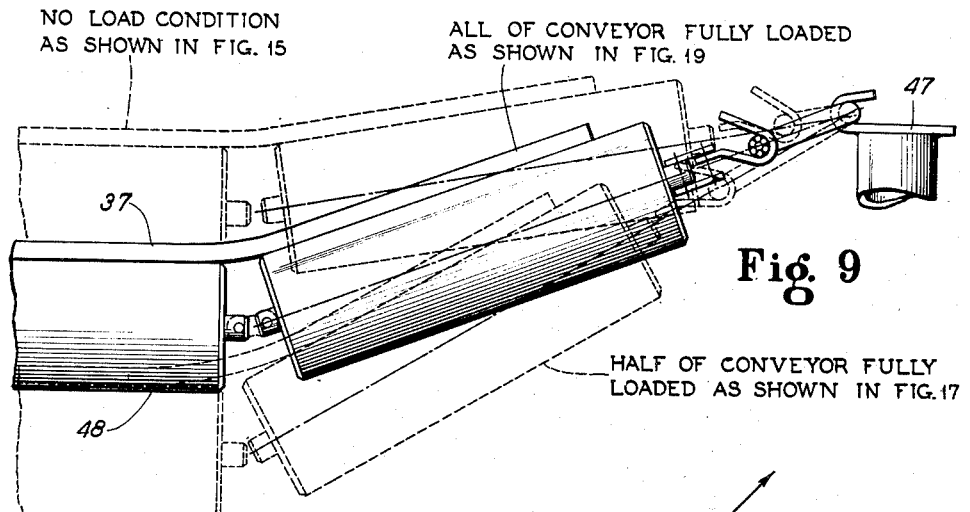
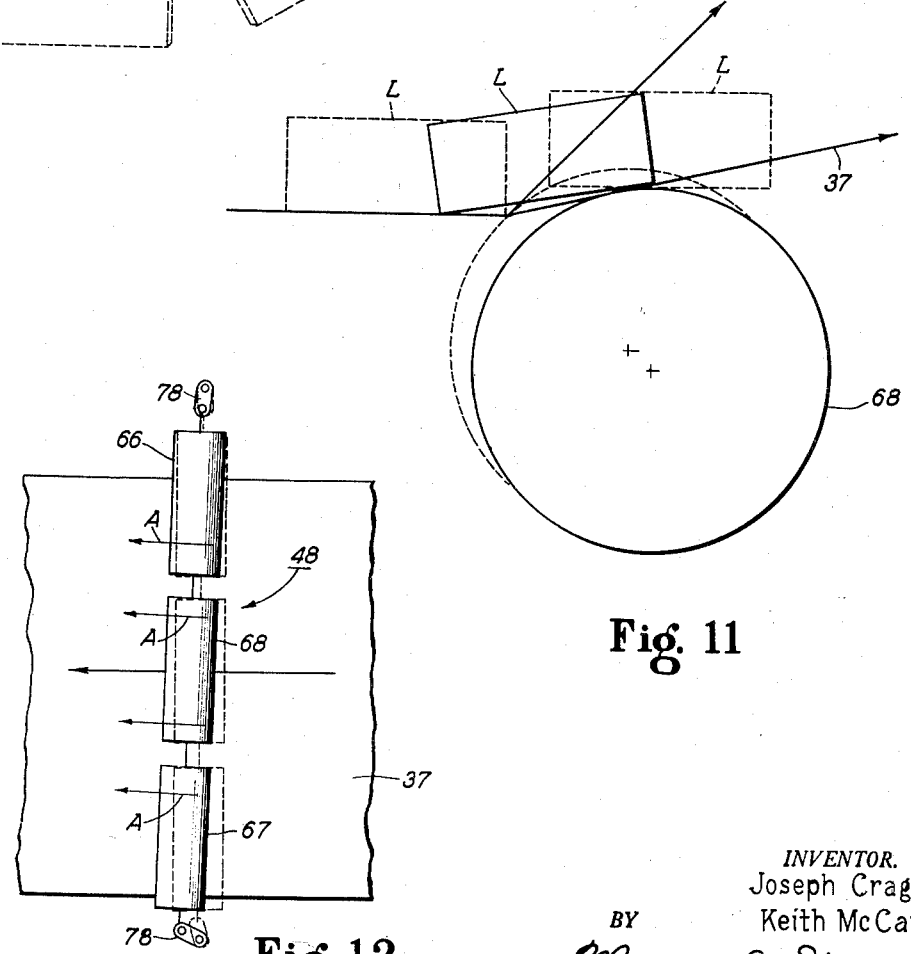
INVENTOR.
Joseph Craggs
Keith McCann
BY
Murray A. Gleeson
ATTORNEY Dec. 4, 1956   J. CRAGGS ET AL   2,773,257
CONVEYOR HAVING FLEXIBLE STRAND SIDE FRAMES AND
TROUGHING ROLLER ASSEMBLY THEREFOR
Original Filed July 11, 1955   9 Sheets-Sheet 5

INVENTOR.
Joseph Craggs
BY   Keith McCann

Murray G. Gleeson
ATTORNEY

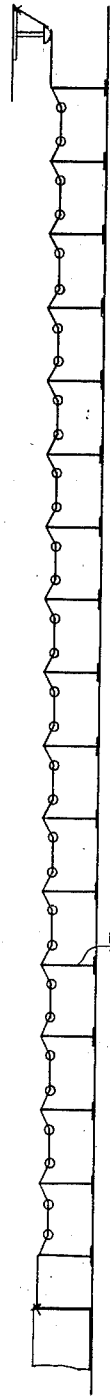
Fig. 15
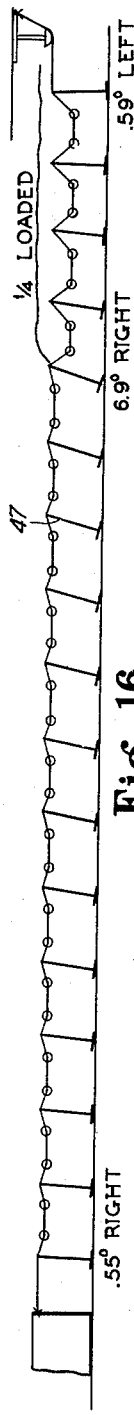
Fig. 16 ¼ LOADED .59° LEFT 6.9° RIGHT .55° RIGHT
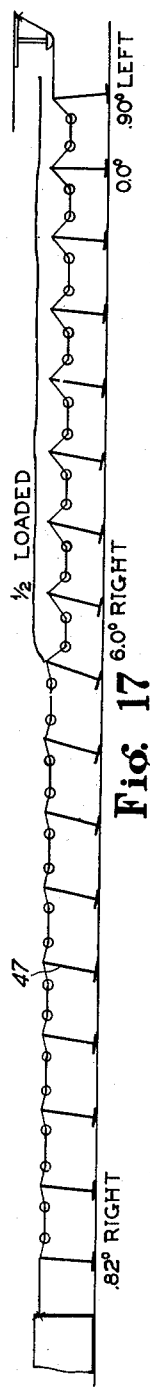
Fig. 17 ½ LOADED .90° LEFT 6.0° RIGHT .82° RIGHT
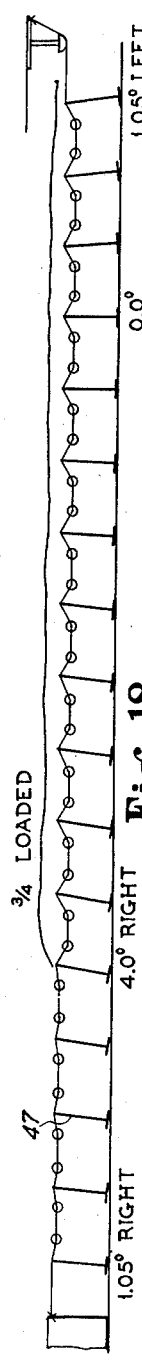
Fig. 18 ¾ LOADED 1.05° LEFT 0.0° 1.05° RIGHT
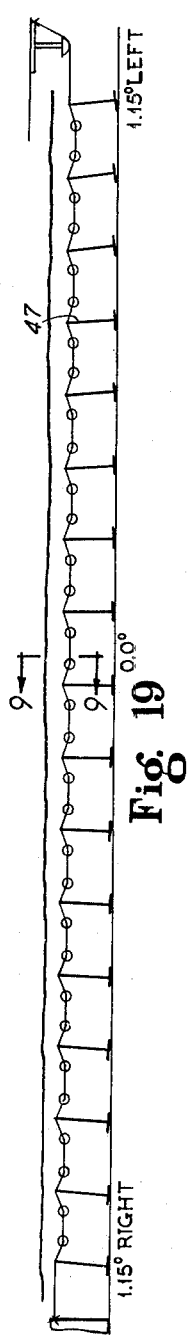
Fig. 19 1.15° LEFT 0.0° 1.15° RIGHT
INVENTOR.
Joseph Craggs
Keith McCann
BY Murray A. Gleeson
ATTORNEY

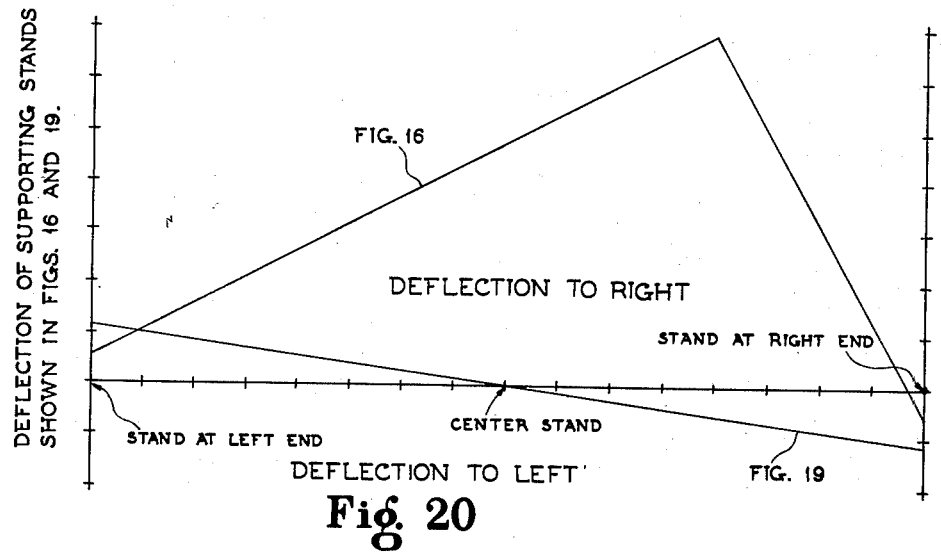
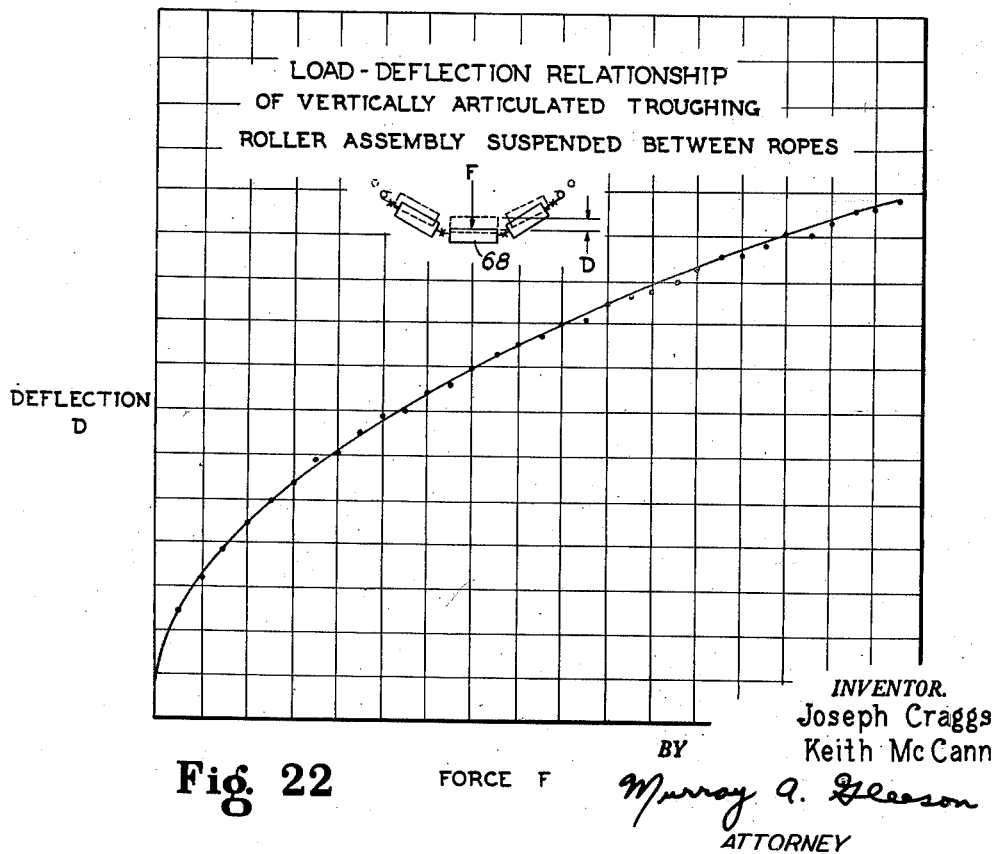

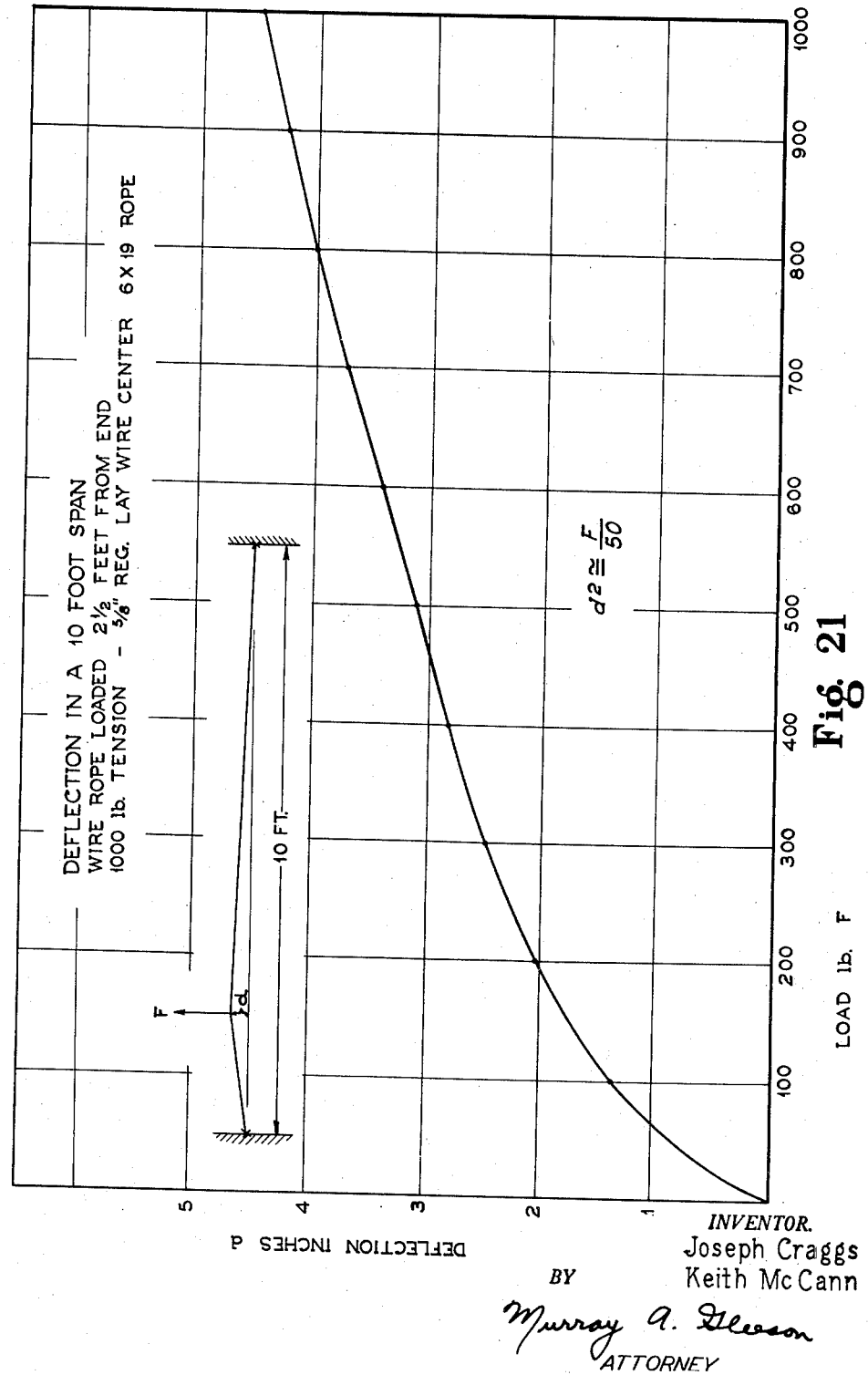

2,773,257

CONVEYOR HAVING FLEXIBLE STRAND SIDE FRAMES AND TROUGHING ROLLER ASSEMBLY THEREFOR

Joseph Craggs and Keith McCann, Taylorville, Ill., assignors to Goodman Manufacturing Company, Chicago, Ill., a corporation of Illinois Continuation of application Serial No. 521,355, July 11, 1955. This application July 27, 1956, Serial No. 600,418

40 Claims. (Cl. 198—192)

This invention relates to belt conveyors and particularly to a new type conveyor in which vertically flexible troughing roller assemblies are suspended between transversely flexible strands or ropes for flexibly supporting a run or reach of the conveyor.

This application is a continuation of our application Serial No. 521,355, filed July 11, 1955, on Rope Frame Conveyor and Troughing Roller Assembly Therefor.

A general object of the present invention is to provide a conveyor having the following advantages over the conventional conveyors constructed with rigid framing and having rigid troughing roller assemblies spanning the rigid framing:

(a) Lower first costs and maintenance, lighter weight, and longer life;

(b) The ability to be easily and quickly extended, as for instance to follow an advancing mine face;

(c) Inherent self-alignment, that is, the taut, flexible support strands being trained along parallel courses maintain the troughing roller assemblies in alignment;

(d) Impact absorption of a very high order, approaching that of a trampoline, so that it is virtually impossible for a sudden high loading to destroy or over stress the flexible framing and troughing roller assemblies.

(e) Improved load retention, spillage being so drastically reduced that clean-up men, walking the line with shovels, are needed infrequently and then mainly at loading points;

(f) Troughing roller assemblies which automatically operate to train the belt properly;

(g) Troughing roller assemblies which automatically tend to center the load on the belt; and (h) Adaptability to widely varying topographical conditions whereby such conveyor can readily be constructed over gaps, ravines, rivers and roadways without massive structural work.

A primary object is to provide a belt conveyor comprising flexible strand means trainable along a course and being transversely flexible at a place where connected to a transversely flexible belt carrying means or troughing roller for concurrent flexing movements of the strand means and of the belt carrying means under loads applied to the latter to thereby absorb impact by the cumulative flexing of the flexible carrying means and of the flexible strand means. In a preferred form, disclosed herein, the cumulative flexing is achieved by suspending the flexible troughing roller assembly at a location on the strand means which is spaced or remote from the place of support of the strand means relative to the ground.

An important feature, in the nature of a "basic building block" of the present invention, is that a pair of flexible strands is trainable along spaced parallel courses, and a flexible troughing roller assembly is suspended across the strands. The reach of the belt is, in turn, supported on the roller assembly.

Another important feature, in connection with the sub-combination set forth in the previous paragraph is that the roller assembly is connected to the strands at locations spaced "upstream" or "downstream" from the strand supports. This provides two-way freedom of movement (vertical and horizontal) for the ends of the roller assembly, resulting in advantages (d) through (g) above.

Another object is the provision of an improved troughing roller assembly, particularly adapted for suspension across flexible strand side frames, which has means permitting limited freedom of motion at each end in a direction parallel to the belt, to automatically train the belt by urging it to run along the center of the troughing assemblies.

Another object is the provision of an improved troughing roller assembly, for a rope side frame conveyor, which is flexible in at least a vertical plane and which is bodily shiftable in a horizontal plane to automatically vary the troughing contour under varying loads, and to vary its horizontal orientation automatically as needed to maintain the belt reach properly trained.

Yet another object is the provision of an improved troughing roller assembly for a rope side frame conveyor in which the ends of the troughing assembly are firmly locked to the ropes to utilize their torsional resistance in supporting the belt as well as in relating the up and down movement of adjacent roller assemblies under varying loads.

Still another object is the provision of a rope side frame conveyor in which impact on the troughing roller assemblies under a moving load is minimized by telegraphing, through the ropes and ahead of the load, a force which depresses the roller assemblies in anticipation of the load.

Another object is the provision of a rope side frame conveyor in which impact is minimized by use of a troughing roller assembly which has the characteristic of an improved "angle of lift," resulting from the ability of the roller assembly to displace itself in a downward and forward direction, as a load moves over it. Thus, the load is lifted through a smaller angle than is the case for conventional, rigidly mounted troughing roller assemblies.

A further object is the provision of a rope side frame conveyor in which spillage is greatly reduced as the result of a troughing assembly which increases both in volume and in load-retaining angle with increasing loads.

Another object is the provision of a rope side frame conveyor in which the edge portions of the load-carrying run automatically pocket a load to hold it in place with minimum spillage.

Another object is the provision of a conveyor in which the belt is so flexibly supported that a load is never subjected to large impacts. This results from the favorable load-deflection characteristics of the troughing roller assemblies, which themselves are freely articulated for deflection in a vertical plane and are suspended across flexible strands at locations where the laterally spaced strands are free to deflect vertically and laterally inward.

A further object is the provision of a rope side frame conveyor in which impact absorption characteristics are improved by the ability of the ropes to shift lengthwise, in limited amounts, toward a section of the conveyor on which the load is increasing, and shift away from a section in which the load is decreasing. For example, as a load is fed onto a moving, empty belt, the laterally spaced flexible support strands will shift from the outby end of the conveyor toward the head of the moving load, and as the tail end of the load passes over the belt, the strands will shift in an outby direction behind the receding load.

Other objects and important features of the invention will be apparent from a study of the specification following taken with the drawings, which together show and describe a preferred embodiment of the invention and what is now considered to be the best mode of practicing the principles thereof. Other embodiments may be suggested to those having the benefit of the teachings herein, and such other embodiments are intended to be reserved especially as they fall within the scope and spirit of the subjoined claims.

In the drawings:

Fig. 1 is a schematic plan view of a belt conveyor having the improvements according to the present invention embodied therein;

Fig. 2 is a side elevational view thereof;

Fig. 3 is a sectional view taken along the line 3—3 of Fig. 1 looking in the direction of the arrows, showing details of a troughing roller assembly also embodying the invention herein;

Fig. 4 is a side elevational view of one of the support stands for the flexible strands of the conveyor seen in Figs. 1 and 2, showing how the stand may tilt slightly from a vertical position in accordance with the loaded condition of the conveyor;

Fig. 5 is a fragmentary plan view showing how the troughing roller assembly of Fig. 3 is connected to one of the flexible support strands;

Fig. 6 is a vertical section taken along the line 6—6 of Fig. 5 looking in the direction of the arrow;

Fig. 7 is a fragmentary plan view of the endless conveyor seen in Fig. 1, showing the manner in which the troughing roller assembly of Fig. 3 may be placed in position of support upon the spaced flexible strands;

Fig. 8 is a view similar to Fig. 7, but showing how the troughing roller assembly adopts positions normal to the longitudinal axis of the conveying reach, so the belt is trained properly for movement;

Fig. 9 is an elevational view of one of the troughing roller assemblies seen in Figs. 3, 7 and 8, and positioned midway of the conveyor as shown in Figs. 15 to 19, and showing how the contour of same varies in accordance with the loading at such assembly, or varies in accordance with the loaded condition of a substantial portion of the total length of the conveying reach;

Fig. 10 shows the range of vertical and horizontal movement of a center or load supporting idler roller in accordance with the loaded condition at a typical troughing roller assembly, and showing how the center or load supporting roller moves in accordance with varying load conditions;

Fig. 11 is a section taken through the center or load supporting roller, showing how the roller may be displaced in a vertical direction, and also in a direction corresponding to the movement of the conveying reach, whereby a load upon the conveying reach can move smoothly over such center or load supporting roller;

Fig. 12 is a schematic plan view of one of the troughing roller assemblies seen in Fig. 3, showing the range of movement of the assembly in a horizontal plane to correct the misalignment;

Figure 13:
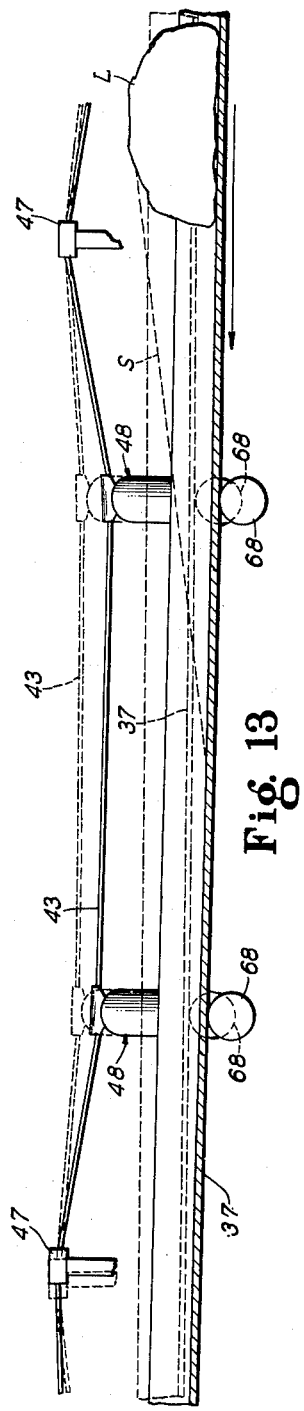
Figure 14:
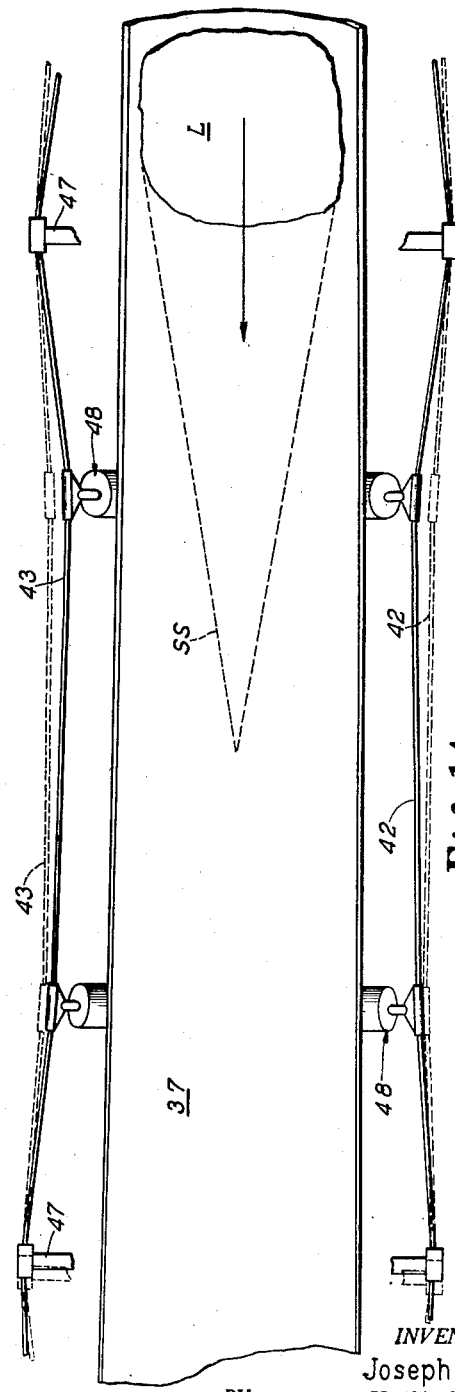

Fig. 13 is a vertical section taken through the belt conveyor seen in Fig. 1, and showing how the load upon the conveying reach is transferred into the flexible strand side frames, said load influencing the displacement of such strands so as to cause the troughing roller assembly at a succeeding point on the conveyor to be displaced to a position which is a function of the load then approaching a troughing roller assembly remote from such succeeding troughing roller assembly;

Fig. 14 is a plan view of Fig. 13.

Figure 23:
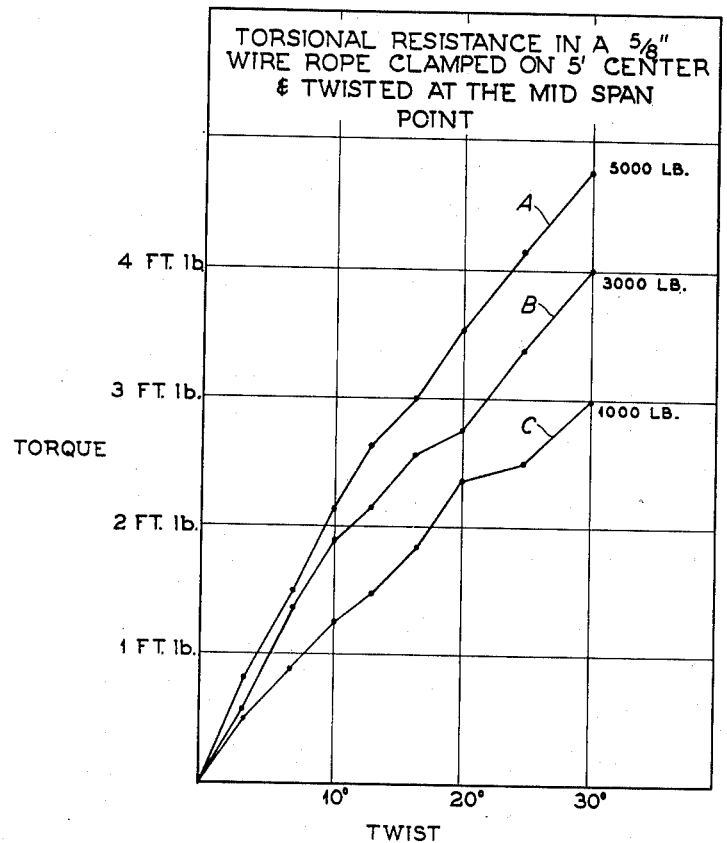

Fig. 15 is a schematic elevational view of the conveyor seen in Figs. 1 and 2 in an unloaded condition, and showing support standards for the flexible strand side frames in vertical positions;

Fig. 16 is a view similar to Fig. 15, but showing the standards displaced or tilted from a vertical position by reason of a load then on the conveyor, the conveyor in this instance being quarter-loaded;

Fig. 17 is a view similar to Fig. 16 but showing the inclination of the standards when the conveyor is loaded along one-half its length;

Fig. 18 is a view similar to Fig. 17, but showing the conveyor loaded along three-quarters of its length;

Fig. 19 shows the conveyor loaded throughout its entire length, and showing the tilting of the support standards during such loading;

Fig. 20 is a diagram showing the inclination of the support standards when the conveyor is loaded for a distance equal to one-quarter of its length, and also when the conveyor is loaded for a distance equal to its entire length;

Fig. 21 is a diagram showing the relationship between a direct lateral load upon the flexible support strand and the deflection thereof incident to such load;

Fig. 22 is a figure similar to Fig. 21, but showing the load-deflection relationship between the vertical load applied to the center idler roller of the troughing roller assembly and the vertical deflection thereof; and Fig. 23 shows the relationship between a torque applied to the flexible strand and the angular deformation thereof for different values of initial tension placed upon such support strand.

Referring now to Figs. 1 and 2 of the drawings, there is shown a belt conveyor indicated generally by the reference numeral 30. Said belt conveyor includes a head or outby section 31, and an inby or tail section 32, both of which may be mounted for movement upon crawler treads if desired. The head section 31 is held in position by roof jacks 33 and the tail section is likewise held in place by roof jacks 34.

An endless belt having a conveying reach 37 and a return reach 38 is reeved around a driving pulley 39 at the head section 31 and around a tail or idler pulley 41 at the tail section 32. The conveying reach 37 is arranged to be supported upon a pair of laterally spaced flexible strands 42 and 43 which extend for the distance between the head section 31 and the tail section 32. The two support strands 42 and 43 extend generally in a common horizontal plane. The outby end of the support strands 42 and 43 may conveniently be anchored at 44 to the head section 31, and the inby end may conveniently be anchored at 46 to a mine roof, there being a strut 45 extending from the roof to provide proper alignment for each support strand. The strut 45 may be of the form as shown in Craggs et al. application Serial No. 521,095, filed July 11, 1955, for Extensible Flexible Frame Conveyor. Each support strand is mounted at spaced intervals on a support standard indicated generally by the reference numeral 47, see also Figs. 3 to 6 inclusive, and the support standards 47 are spaced at intervals between the head section 31 and the tail section 32.

The conveying reach 37 is arranged to move over and be supported upon idler roller assemblies indicated generally by the reference numeral 48, as seen also with respect to Figs. 3 to 6 inclusive, said troughing roller assemblies 48 being suspended between the spaced strands 42 and 43.

Referring now to Figs. 3 to 6 of the drawings, the support standards 47 include laterally spaced vertical tubing members 49 which are maintained in proper spaced relationship by a transverse extending I-beam 51. Each of the tubular standards 49 has telescopically fitted therein a tubular member 52 having a foot 53. The position of the telescoping members 49 and 52 with respect to each other is adjusted by means of a pin 54 passing through one of a plurality of drilled holes 56 in telescoping member 52 and a pair of matching holes 57 in the outer tubular standard 49, the pin 54 being secured in position by a cotter pin 58.

The holes 56 and 57 are drilled on different centers so that it is possible to adjust the two tubular members 49 and 52 for different total lengths by passing the pin 54 through any pair of aligned holes 56 or 57. It will be seen that the position of the feet 53, and the telescoping members 49 and 52 may thus be adjusted to take care of irregularities of a mine floor or the like, yet maintain the tops of the tubular standards 49 at the same height.

The top of each standard 47 is provided with a saddle 59 having a U-shape, as shown, the cables 42 and 43 wedging themselves in the bight of the U-shaped saddle in the manner seen in Figs. 3 and 4. Thus, the bights grip the flexible strands in a fashion tightly enough to prevent rotation of the strands therein, the strands thereby serving as torque resisting means to the loads imposed on the troughing roller assemblies.

The return reach 38 of the endless belt is supported by the standards 47, and is guided over a return roller 61 supported at each end upon brackets 62 which are bolted at 63 to a plate 64 welded to the inner side of the tubular member 49.

Each troughing roller assembly 48 consists of a plurality of idler rollers which can vary in number according to the width of the belt. In this case three idler rollers are shown, each assembly including a pair of inclined or wing rollers 66 and 67, and a center or load supporting roller 68. Each of the rollers is arranged to turn upon a dead shaft 69 and the rollers 66, 67 and 68 are connected so as to move freely relative to each other in a vertical direction to accommodate the variations in a load L on the conveying reach 37. For example, each of the troughing rollers 66 and 67 is pivotally connected to the load support rollers 68 at the shafts 69 in this case by means of a pair of links 71 disposed on each side of the shafts 69, and pin connected to each shaft 69 at their ends as at 72. Each of the pins 72, 72 is disposed on an axis extending longitudinally of the belt whereby the rollers are interconnected for free vertical articulation relative to one another and in response to variations in the load L.

The wing rollers 66 and 67 are connected respectively to the flexible support strands 42 and 43 by means of pairs of swivel links 73 connected by a pin 74 to the ends of the adjacent dead shaft 69 and by a pin 76 passing through one limb 77 of a U-shaped hanger 78, the bight of which closely grips the cable 42 or 43 as the case may be. The limb 77 is flanked by washers 75 which surround the pin 76 and occupy the space between the limb 77 and the swivel links 73.

It will be noted that the pins 74 and 76 lie substantially in a vertical plane, as seen in Figs. 3 and 6, and the links 73 connecting same are thus able to swing in what approximates an horizontal plane for the purpose of training the belt properly as will appear in more detail as this specification proceeds.

As seen in Fig. 6, the limbs of the U-shaped hanger 78 are provided with apertures 79, each of which receives a locking pin or spike 81 which acts to clamp the strand 42 or 43 into the bight of the hanger 78. During the set-up operation of the conveyor 30 the operator will place the roller assemblies 48 at regularly spaced intervals along the flexible support strands 42 and 43, and anchor same in position by means of the pins or spikes 81 where desired.

The troughing roller assemblies 48 are placed in a position normal to the longitudinal axis of the conveying reach 37 as can be determined by the eye. However, such placement may be at angles other than right angles to the strands 42 and 43 and to the longitudinal axis of the conveying reach 37.

Such placing of a troughing roller assembly of the prior art would result in misalignment of the belt, causing it to ride unevenly, and in some cases to ride high on one side or the other of the wing rollers. In the prior art devices it was necessary to correct such misalignment by means of alignment correcting or training rollers which bore against the edges of the belt. These rollers were employed for the purpose of swinging a troughing roller assembly about a center pivot (the assembly in such case being mounted in a rigid frame), the full swinging of the rigid assembly perhaps correcting about one inch of misalignment of the belt. Such training roller assemblies were generally mounted approximately two hundred feet apart, and would by a "brute force" operation correct the misalignment that had accumulated over the two hundred foot distance.

However, by the structure according to the present invention, the troughing roller assemblies will adapt during movement of the belt a position at right angles to the longitudinal axis thereof. Such shifting of the troughing roller assembly is seen with particular reference to Figs. 7 and 8, and it will be observed that the swivel connections at the outer end of the troughing rollers 66 and 67 have shifted in such a fashion that each troughing roller assembly 48 is in the proper right angle position thereby insuring that the belt will run with proper alignment at all times.

In fact, each assembly is free to shift in a horizontal plane in directions to correct to a small degree at each such troughing roller assembly the misalignment of the conveying reach. It has been found that the training effect is primarily caused by the center load supporting roller 68, and in actual test conditions the center load supporting roller 68 has been found to be hunting back and forth at each end by distances of from 1/8 to 3/16". This swing or hunting of the ends of the load supporting roller shifts the belt at that point in a direction towards the center of the conveyor. The troughing roller assemblies are commonly mounted at distances approximately five feet apart, and the sum total effect of many such troughing roller assemblies is equal to or greater than the effect of a conventional training roller located every two hundred feet.

The assemblies thus prevent an accumulative misalignment by making a correction of the misalignment at each assembly.

The swivel connection at the outermost ends of the troughing roller assembly 48 is rigid in a vertical plane, as has been described, and by reason of the clamping action afforded by the hanger 78 and the locking spike 81, the load L carried by the conveying reach 37 will be transmitted into the side supporting flexible strands 42 and 43, and the torsional resistance thereof will prevent undue sagging of the assembly by reason of such load. In fact, it has been observed that the twisting of the side supporting flexible strands by reason of such load will be transmitted into the next adjacent troughing roller assembly, so that it will deform in a vertical plane an amount which is related to the deformation in a vertical plane at an adjacent loaded troughing roller assembly, the net effect being to provide smooth travel of the load over the troughing roller assemblies.

In order to limit the torsional strain to which the strands 42 and 43 are subject under load the bights of the U-shaped saddles 59 will be preferably small enough to grip the strand firmly so as to limit the strain to that portion of the strand between adjacent saddles. By this construction it is possible to regulate the hardness or the softness of the "ride" of the material on the conveying reach by changing the length of the span between adjacent saddles, and by changing the initial tension placed on the support strands.

It will be observed, of course, that the connections of the center load supporting roller 68 to the inclined troughing or wing rollers 66 and 67 are such as to permit the movement of the rollers with respect to each other in a vertical plane. In other words, the rollers may orient themselves with respect to each other in accordance with the load thereat, limited only by the tension in and the torsional resistance of supporting cables 42 and 43.

The structure disclosed herein presents some unusual phenomena which is strikingly unusual considering the simplicity of the assemblies making up the total combination. A number of these have been recited in the objects of this invention, and conceivably could not be apparent nor understood without explanation of phenomena taking place in actual production use of the structure described and claimed herein.

Reference accordingly will be made to the remainder of the figures of the drawings in this application, and it is thought that a completed description of the phenomena will tend to make the invention more clear and distinct.

One of the important features of the invention is the fact that the structure embraced thereby tends to sense the oncoming of a load on the belt. Stated conversely, the load on the belt in effect "telegraphs" the oncoming thereof so as to cause portions of the structure remote from the load to adapt itself to the oncoming load.

Referring now to Figs. 11, 13 and 14 of the drawings, there is shown the phenomena obtaining in the laterally spaced support strands 42 and 43 and also in the troughing roller assemblies 48 which span the support strands. In Figs. 13 and 14 there is shown the load L moving with the conveying reach 37 from the right to the left in a direction towards the right one of the two troughing roller assemblies 48 shown. The load L approaching the troughing roller assembly 48 causes it to be displaced downward, the center load supporting roller 68 moving from the dotted line position shown to the full line position shown. The force transmitted to the troughing roller assembly 48 by the load L causes its deflection downward causing the support strands 42 and 43 to be displaced downward as seen in Fig. 13, and inward as seen in Fig. 14, and as also seen in Fig. 9, reference to which figure will be made subsequently in more detail.

The displacement or deformation of the supporting strands 42 and 43 will increase as the load L comes closer to the right hand troughing roller assembly 48. This increasing displacement in a downward and inward direction of the support strands 42 and 43 will cause a displacement of the support strands at the next troughing assembly 48 (the left hand one seen in Figs. 13 and 14). This latter troughing roller assembly 48 will likewise have its center load supporting roller displaced from the dotted line position seen to the full line position, and as the load L moves past the right hand troughing roller assembly and to positions closer to the left assembly, the center load supporting the roller 68 of the left assembly will displace increasing amounts in accordance with the proximity of the load L. Obviously, the deflection of the support strands 42 and 43 will increase to a maximum as the load is directly above the center load supporting roller 68, decreasing from such maximum as the load moves away from the assembly.

The phenomena have been described with reference to what might be considered a point load, and in addition to the described displacement of the troughing assembly and the support strands, there is what may be called a "pocketing" effect where the belt partly encloses the load by inward displacement of the support strands.

The phenomena described may be likened to the casting of a shadow by the load L (indicated schematically by the triangles S and SS in Figs. 13 and 14), or the "telegraphing" thereof of its imminence to the next proximate troughing roller assembly. This "telegraphing" or "shadow" effect causes the flexible strand frames to yield as has been described in accordance with the then loading on the conveyor or the imminent loading thereon; so the roller assemblies actually begin to duck down to receive a load before the load, or even its shadow effect, ever reaches it, thereby minimizing shock or impact as the load passes over the roller assembly.

The foregoing phenomena of the flexible strands and the troughing roller assemblies also results in what might be described as a smooth "ride" of the material moving on the conveyor. For example, see Fig. 11, the deflection of the center load supporting roller 68 from the dotted line position seen to the full line position seen results in a very small "angle of lift" required of a point or concentrated load moving on the conveying reach 37. Heretofore, where rigid side framing was employed with rigid troughing assemblies, the sag vertically of the conveying reach between the troughing assemblies caused the loads on the belt, particularly spot loads, to bump over the assembly. In such conveyors it was necessary, particularly in coal mines, to have a man walk the length of the conveyor line to take care of the spillage from the sides of the belt. On the other hand it has been found, in operations employing a conveyor of the type disclosed herein the "ride" is so smooth and spillage is so minimized, that such labor is drastically reduced.

It may be noted that the load L changes the troughing contour of the conveying reach, to increase the load carrying capacity. This change in contour of the conveying reach "pockets" the increased load, as heretofore explained, and greatly reduces the spillage.

Referring to Fig. 12, a plan view of the conveyor is shown with the belt 37 detrained an exaggerated amount toward the left-hand wing roller 67. This has caused the entire roller assembly to shift in a horizontal plane from the broken line to the solid line positions, as permitted by the swinging of the links or shackles 78. Since the belt will then attempt to run over the rollers in a direction parallel to the arrows A (which are transverse to the roller assembly), the belt will then be retrained back toward the center of the conveyor. When the belt reaches the center, the roller assembly will resume its normal transverse or lateral position for a centered belt as shown in the left-hand roller assembly of Fig. 7. It will be apparent that the present improved roller assembly is capable of automatically training the belt toward the center regardless of which direction it is detrained and regardless of the direction of movement of the belt.

Other phenomena obtaining with a conveyor constructed as seen in Figs. 1 and 2 may be described with particular reference to Figs. 15 to 19 of the drawings.

It has been found that all of the support standards 47 shift through small vertical angles in accordance with the loading of the conveyor, such shifting being probably incident to the increase in stress and the consequent strain or deformation on the flexible support strands 42 and 43.

Thus, for example, in Fig. 15 there is shown a conveyor according to the present invention under a condition of no load. Under this condition, all of the support standards 47 assume a perfectly vertical position. As the conveyor is loaded from the right, the load traveling thereon to the left, the standards 47 tilt slightly in accordance with the condition of the load at such point or portion of the conveyor, and moreover the standards remote from such load tilt lessening amounts in accordance with the distance from the load.

For example, in Fig. 16 the conveyor is shown at the instant of being one-quarter loaded, and the standards at the front of such moving load may shift through a vertical angle of approximately 6.9° to the right, the standards to the right thereof and toward the inby end of the conveyor tilting through smaller angles. The standard at the extreme inby end has been found to shift through a vertical angle .59 degree to the left. In front of the moving load the standards tilt through decreasing angles and at the outby end the standard shift through but very small angle of 0.55° to the right.

In Fig. 17, the conveyor is shown at the instant it is loaded for half its length. At this instant, the stand at the leading edge of the load is tilted 6.0° to the right and to a lesser degree in both directions therefrom. The extreme outby and inby stands are tilted respectively .82° to the right and .90° to the left. The second stand from the inbye end, where there is a transition from right to left tilt, has no tilt at all.

Referring now to Fig. 18, at the instant when the conveyor is loaded for three-quarters of its length, the stand at the leading edge of the load will likewise be displaced through a vertical angle, which in this case is 4.0° to the right, the standards inbye of the moving front of the load being deflected through decreasing angles, until the standard at approximately the quarter point will have zero degrees of tilt. Standards inbye of such approximate quarter point will be tilted to the left in increasing amounts, the standard most inbye being tilted 1.05° to the left.

Referring now to Fig. 19, it will be observed that when the conveyor is loaded throughout its length the standards on each side of the midpoint of the conveyor will be deflected increasing amounts from the vertical, those to the left of the midpoint of the load being tilted to the right, and those to the right of the midpoint being tilted to the left, the angular displacement of the standard at the respective outby and inby end of the conveyor being 1.15°.

All of the foregoing discussion with respect to Figs. 15 to 19 illustrates how the action of the flexible strand side frame is made possible by the angular shifting or tilting of the support standards. An illustrative example of such shift of a particular support standard is seen best with reference to Fig. 4. Fig. 20 illustrates the deflection of the support standards in each direction on both sides of the moving front of the load. The upper line in Fig. 20 indicates the deflections of the standards when the conveyor is loaded for one-quarter of its length as seen also in Fig. 16, all of the standards shifted to the right increasing amounts toward the load front. The lower line in Fig. 20 indicates shifting of the standards when the conveyor is fully loaded as seen in Fig. 19, all of the standards to the left of the midpoint of the conveyor being deflected to the right, while all of the standards to the right of the midpoint of the load being deflected to the left.

As was previously described with reference to Figs. 13 and 14 of the drawings, the load at each troughing assembly was shown to influence the deflection of the flexible support strand and the deflection of the troughing roller assemblies in front of a moving load. Fig. 21 illustrates the relationship between the deflection in a ten foot span of flexible strand which is loaded two and one-half feet from a point where it is supported at one of the standards 47. In this case, the flexible strand was given an initial tensile load of 1,000 pounds, and the deflection measured against a load having its direction laterally of the strand. It was found that the load-deflection curve approximated that of parabola of the equation $$d^2 = \frac{F}{50}$$

where $d$ is the deflection in inches and $F$ is the lateral load in pounds.

Referring to Fig. 22, it was also found that the load-deflection curve where the deflection was measured against the load on the central load supporting roller 68 also resulted in a curve approximately that of a parabola, in this case the deflection being a vertical one and the load $F$ being applied in a vertical direction.

Thus, it will be seen that the load-deflection curve of an actual roller assembly suspended between ropes, as shown in Fig. 22, represents a cumulation of parabolic force-deflection curves resulting from the additive effects of transversely deflecting three separate flexible strands, two of which are the ropes 42 and 43 and the third being the idler assembly 48. This means that a very small initial force F (see Fig. 22) will result in a relatively large downward deflection of the roller assembly; thus, the latter ducks readily downward in anticipation of a coming load, thereby reducing impact as the load passes over it.

It has also been found that the mounting of troughing roller assemblies 48 in the manner as shown in Figs. 3 to 6 inclusive makes use of the torsional resistance of the flexible strands. It will be remembered that the U-shaped brackets 77 are held tightly to the flexible strands by means of the spike 81, the swivel connection at the links 73 being rigid in a vertical plane but free to swivel in an horizontal plane.

Referring now to Fig. 23 it has been found that a definite relationship exists between the torque applied to the flexible strands and the angular twist or deformation of the strands and the initial stress or tension placed upon the strands. For example, in curve (A) the strands have an initial tension of 5,000 pounds, and the relationship between torque and the resulting angular twist is shown. Curve (B) illustrates that the strand is less resistant to angular deformation when the initial tension on the strand is of a smaller value, and curve (C) likewise illustrates the lessened ability of the strand to resist angular deformation when the initial tension of the strand is still a smaller amount.

Referring now to Figs. 9, 15, 17 and 19, a relationship exists between the length and location of the loaded portion of the belt and the vertical displacement of the roller assemblies. For example, consider the troughing roller assembly, shown in Fig. 9, which is the one at a point midway between the ends of the conveyor. When there is no load at all on the belt (Fig. 15), the roller assembly will be in the upper, broken line position of Fig. 9. As the load begins to move onto the conveyor, the roller assemblies at the inby end will be depressed while actually causing other of the roller assemblies, including the one shown in Fig. 9, to be raised slightly (to a position, not shown, which is above the upper broken line position of Fig. 9) as the ropes ahead of the load are pulled taut. When the load has advanced to the halfway point, the roller assembly will be depressed to its maximum downward deflection as shown by the lower broken line view in Fig. 9. As the load continues to progress, and the belt is fully loaded from end to end (Fig. 19), the roller assembly will be shifted upward to the full line view of Fig. 9. This displacement of the roller assemblies is related to the tilting of the standards 47 toward the loaded portion of the belt, this tilting making available additional strand length for both vertical and horizontal displacement of the ends of the idler assemblies under varying load conditions.

As an interesting phenomenon occurring when the conveyor is fully loaded, the full load condition of the entire conveyor results in a displacement that is less than that which occurs when the conveyor is loaded along half its length.

However, irrespective of the fact that the total displacement in a vertical direction of each assembly is less than for the condition when the conveyor is half loaded, each of the troughing roller assemblies at a concentrated load can shift vertically to accommodate such concentrated load, as for example, a large lump of coal. Under such condition the troughing roller assemblies in the "shadow" of such load will deform or displace in a vertical direction as seen with respect to Figs. 13 and 14.

In conventional rigid side frame conveyors, which support the troughing roller assemblies at fixed levels, loads are carried by the belt in an uneven path, up over a roller assembly and then down to the bottom of the catenary of the belt between roller assemblies. In the conveyors of the present invention, there will be some catenary sag of the belt conveying reach 37 between troughing roller assemblies 48 so as to provide a path of load movement which would be uneven, as in conventional conveyors, except for the concurrent flexing movement of the assemblies 48 and the strands 42, 43; for the feed-in of strands 42, 43 toward the loaded portion of the belt as illustrated in Figs. 15–19; and for the improved angle of lift illustrated in Fig. 11; all of these combining to moderate the uneven path of the load movement as the load is carried by the belt along the supporting structure. In fact, this flexible load supporting structure tranquilizes a moving load so effectively that a large lump, constituting in effect almost a point load, can be carried from one end of the conveyor to the other with so little bobbing movement that it is not perceptible except on close study.

All of the foregoing phenomena described with reference to Figs. 7 through 23 of the drawings has been observed in connection with large installations of a commercial sort. These phenomena were largely not completely understood at the time of filing of applicants' parent application, and the explanation in this continuation application may help serve to understand the precise nature of applicants' invention.

The specific arrangement and positioning of the troughing roller assemblies and support stands whereby they are disposed along the flexible strands in order of support stand—two roller assemblies—support stand—two roller assemblies—etc., is the subject matter of a co-pending application of Roy F. LoPresti and Jerome C. Salmons, Serial No. 521,772 filed July 13, 1955 on Rope Frame Conveyor with Controlled Belt Troughing.

While the invention has been described in terms of an embodiment which it has assumed in practice, the scope of the invention should not be deemed to be limited by the precise embodiment herein shown, such other embodiments being intended to be reserved especially as they fall within the scope of the claims here appended.

We claim:

1. In a belt conveyor having flexible strand means trainable along a course, supporting means for supporting said flexible strand means, an elongated belt carrying anti-friction means adapted to have the load carrying run of a movable belt supported for movement thereacross, said anti-friction means being flexible in a direction transverse to the length thereof, connecting means connecting said anti-friction means to said strand means remote from said supporting means for concurrent flexing movements of the strand means and anti-friction means under loads applied to said anti-friction means; said flexible strand means, flexible anti-friction means, and connecting means cooperating to absorb impact by the cumulative flexing of said flexible anti-friction means and of said flexible strand means remote from said supporting means.

2. In a belt conveyor, flexible strand means trained along a course and having a portion which is transversely deflectable, and elongated belt carrying anti-friction means adapted to have the load carrying run of a movable belt supported for movement thereacross, said anti-friction means being flexible in a direction transverse to the length thereof while varying the spacing between the ends thereof, connecting means between said transversely deflectable portion of the strand means and the respective ends of said anti-friction means permitting limited freedom of movement of said ends toward and away from one another for concurrent flexing movements of said deflectable portion of the strand means and said anti-friction means under loads applied to said anti-friction means; said flexible strand means, flexible anti-friction means, and connecting means constituting a structure which is yieldable to absorb impact by the cumulative flexing of said deflectable strand means portion and of said flexible anti-friction means.

3. A belt conveyor comprising a pair of laterally spaced flexible strands, said strands having adjacent portions which are relatively moveable to vary the spacing therebetween, at least one troughing roller assembly extending transversely between said strands for supporting the conveying reach of a conveyor belt, said troughing roller assembly being flexible in a direction to vary the spacing between the ends thereof, said ends being secured to said flexible strands at locations where said strands are relatively movable to vary the spacing therebetween; whereby load applied to said troughing roller assembly is yieldably supported by said flexible strands and said flexible troughing roller assembly.

4. In a belt conveyor, a pair of flexible strands trained along generally parallel courses; means for supporting said strands to limit relative transverse movement of said strands at one location yet providing greater relative transverse movement at another location spaced along the strands from said one location; and a troughing roller assembly flexible at least in a plane normal to the strands and suspended across the strands at said another location, said troughing roller assembly adapted to support the material carrying reach of a conveyor belt; said flexible strands and flexible troughing roller assembly constituting cumulatively yieldable support means for absorbing impact loads on said troughing roller assembly.

5. In a belt conveyor, a pair of laterally spaced flexible strands, at least one elongated troughing roller assembly extending transversely between said strands for supporting the load carrying reach of a conveyor belt, said troughing roller assembly being flexible along the longitudinal axis thereof in a vertical direction, and a connection between each end of said troughing roller assembly and the adjacent flexible strand, each of said strands being free at said connections to deflect vertically and horizontally in accordance with the load on said troughing roller assembly; said flexible strands and flexible troughing roller assembly being cumulatively yieldable to absorb impact loads on said troughing roller assembly.

6. In a belt conveyor, a pair of laterally spaced flexible strands, at least one elongated troughing roller assembly extending transversely between said strands for supporting the load carrying reach of a conveyor belt, said troughing roller assembly being flexible along the longitudinal axis thereof in a vertical direction, each troughing roller assembly comprising a series of roller supporting members having vertically flexible interconnections therebetween and a connection between the roller-supporting member at each end of said troughing roller assembly and the adjacent flexible strand; each of said roller-supporting members at each end of said assembly constituting a vertically rigid cantilever member extending from the strand inward to the first interconnection, each of said strands being free at said connections to deflect vertically and horizontally in accordance with the load on said troughing roller assembly whereby flexing movements of said strands at said connections and of said troughing roller assembly are cumulatively effective to absorb impact load on said troughing roller assembly, and whereby further flexing of said troughing roller assembly at each interconnection is resisted at least in part by the vertical rigidity of said cantilever members.

7. In a belt conveyor, a pair of laterally spaced flexible strands trained along generally parallel courses, said strands having portions which are relatively movable to vary the spacing therebetween, at least one troughing roller assembly extending laterally between said strands and adapted to support a belt for movement thereacross, said troughing roller assembly comprising a series of roller-supporting members, an interconnection between adjacent of said members enabling said adjacent members to move relative to one another about said interconnection in a plane normal to said strand portions, a pair of brackets, each of said brackets supported at a respective one of said strand portions, and connections between said roller-supporting members at opposite ends of said series and respective ones of said brackets, said connections being rigid against substantial relative movement between said roller-supporting members and the respective brackets in said plane normal to the strand portions, whereby a load on said troughing roller assembly can be supported at least in part by said rigid connections in the direction of said plane.

8. A troughing roller assembly comprising a plurality of anti-friction members disposed along a longitudinal axis, means interconnecting said members along said axis for individual relative movement of each member in relation to each other in one plane and unitary movement of the members in another plane which is disposed substantially normal to said one plane and common with said axis, and a connecting means connecting a mounting means to each end of said assembly for relative movement of each mounting means in relation to the respective end of said assembly in said another plane, said connecting means being relatively rigid against relative movement of each mounting means in relation to the respective end of said assembly in said one plane whereby a belt passing over the members in a direction substantially parallel to the one plane would be supported at least in part in the direction of the another plane by the relative rigid connection between the mounting means and the respective ends of the assembly.

9. In a belt conveyor, a pair of flexible strands trained along generally parallel courses; supporting means for said strands; an elongated troughing roller assembly being flexible in a direction transverse to the length thereof and connected to said strands at locations spaced from said supporting means; and an orbitally movable belt with the load-carrying reach running along and supported by the troughing roller assembly; said flexible strands and flexible troughing roller assembly being cumulatively effective to yieldably support loads applied to the belt.

10. In a belt conveyor, a pair of flexible strands trained along generally parallel courses; supporting means for said strands effective to maintain them spaced a fixed distance apart at the supporting means but relatively free for transverse movement relative to one another at a location remote from said supporting means; a troughing roller assembly extending between said strands and comprising a series of roller-supporting members, an interconnection between adjacent of said members enabling said adjacent members to move relative to one another about said interconnection in a plane normal to said strands at said remote location, a pair of brackets, each of said brackets supported at a respective one of said strands at said remote location, and connections between said roller-supporting members at opposite ends of said series and respective ones of said brackets, said connections being rigid against substantial relative movement between said roller-supporting members and the respective brackets in said plane normal to the strands at said remote location; and an orbitally movable belt with its load-carrying reach running along and being supported by the troughing roller assembly whereby a load on said troughing roller assembly can be supported at least in part by said rigid connections in the direction of said plane.

11. In a belt conveyor, a pair of flexible strands trained along generally parallel courses; means for supporting said strands to limit relative transverse movement of said strands at one location yet providing greater relative transverse movement at another location spaced along the strands from said one location; a troughing roller assembly being flexible at least in a plane normal to the strands and suspended across the strands at the another location; and an orbitally movable belt with its load-carrying reach running along and supported by the troughing roller assembly; said flexible strands and flexible troughing roller assembly constituting yieldable support means cumulatively effective to absorb impact loads applied to the belt.

12. In a belt conveyor, a pair of flexible strands trained along generally parallel courses; said strands being spaced apart at one location and relatively free to move in and out relative to one another at a second location remote from said one location; a troughing roller assembly extending between said strands and comprising a series of roller-supporting members, an interconnection between adjacent of said members enabling said said adjacent members to move relative to one another about said interconnection in a plane normal to said strands at said second location, a pair of brackets, each of said brackets supported at a respective one of said strands at said second location, and connections between said roller-supporting members at opposite ends of said series and respective ones of said brackets, said connections being rigid against substantial relative movement between said roller-supporting members and the respective brackets in said plane normal to the strands at said second location; an orbitally movable belt having the load-carrying reach thereof running along and supported by the troughing roller assembly; whereby a load on said troughing roller assembly can be supported at least in part by said rigid connections in the direction of said plane.

13. In a belt conveyor, a pair of laterally spaced flexible strands trained over generally parallel courses; supporting means for supporting said strands at spaced locations, said strands being longitudinally shiftable relative to said locations while being so supported, a vertically flexible troughing roller assembly suspended across said strands intermediate the supporting means and effective to pull said strands downward and inward when loaded, a loaded portion of said conveyor requiring greater lengths of the flexible strands than an unloaded portion thereof, whereby said strands are longitudinally shiftable toward a loaded portion of said conveyor in response to downward movement of the troughing roller assembly accompanied by increased downward and inward deflections of said strands when loaded.

14. In a belt conveyor; a pair of laterally spaced flexible strands; supports at intervals along said strands to control the catenary sag thereof; a vertically flexible troughing roller assembly suspended across said strands intermediate said supports and being deflectable downwardly under load for pulling said strands downwardly and inwardly; a conveyor belt having the load-carrying run movable along said troughing roller assemblies; each of said supports comprising a tippable stand effective to tip in a direction toward a loaded portion of the belt to feed said flexible strands in the said direction as required by increased downward deflection of the troughing roller assemblies accompanied by increased downward and inward deflections of said strands where loaded.

15. In a belt conveyor; a pair of laterally spaced flexible strands; supports at intervals along said strands to control the catenary sag thereof; a vertically flexible troughing roller assembly suspended across said strands intermediate successive supports and being deflectable downwardly under load to decrease the spacing between the ends of said roller assembly; each troughing roller assembly being connected at its ends respectively to said strands where the strands can be pulled in toward one another under loading applied to the troughing roller assembly; a loaded portion of said conveyor requiring greater lengths of the flexible strands than an unloaded portion; a conveyor belt having a load-carrying run movable along said troughing roller assemblies; each of said supports including a movable member fixedly connected to a respective one of said strands and movable longitudinally with the respective strand, each of said supports also including means for supporting the respective movable member at a predetermined level during such longitudinal movement, each support thereby being effective to support the respective flexible strand while the latter shifts longitudinally in a direction as required by inward and downward deflection of the strands where loaded.

16. In a belt conveyor; a pair of laterally spaced flexible strands; supports at intervals along said strands to control the catenary sag thereof; a vertically flexible troughing roller assembly suspended across said strands intermediate successive supports and being deflectable downwardly under load to decrease the spacing between the ends of said roller assembly; each troughing roller assembly being connected at its ends respectively to said strands where the strands can be pulled in toward one another under loading applied to the troughing roller assembly; a loaded portion of said conveyor requiring greater lengths of the flexible strands than an unloaded portion; a conveyor belt having a load-carrying run movable along said troughing roller assemblies; each of said supports including a ground engaging base with a standard extending upwardly therefrom into supporting engagement with one of said strands for maintaing the respective strand at a predetermined level while enabling longitudinal shifting movement of the strand relative to ground under the base as required by inward and downward deflection of the strands where loaded.

17. In a belt conveyor, a pair of flexible strands trained along generally parallel courses; said strands having adjacent portions which are transversely deflectable to vary the spacing between said portions under loads applied transversely thereto; troughing roller means adapted to have the load-carrying run of a movable belt supported thereon, said troughing roller means being transversely flexible along the length thereof to vary the spacing between the ends thereof when deflected, said troughing roller means having belt engaging roller elements which are adjustable relative to one another in a plane nomal to the strands; and connecting means connecting said troughing roller means to said portions of said flexible strands whereby concurrent flexing movements of said portions of said flexible strands and of said troughing roller means are cumulatively effective to absorb impact loads on said troughing roller means.

18. A belt conveyor comprising a pair of laterally spaced flexible strands, at least one elongated troughing assembly extending transversely between said strands for supporting the conveying reach of a conveyor belt, said troughing assembly being flexible in a plane normal to the strands to vary the spacing between the ends thereof, said troughing assembly having belt engaging antifriction elements which are adjustable relative to one another is a plane normal to said strands, said ends of the troughing assembly being secured to said flexible strands at locations where said strands are relatively movable to vary the spacing therebetween; whereby load applied to said troughing assembly is absorbed by concurrent flexing of both of said flexible strands and of said troughing assembly.

19. In a belt conveyor, a pair of laterally spaced flexible strands, supports for said flexible strands spaced along the lengths of said flexible strands, troughing roller assemblies spaced along the lengths of said flexible strands at locations remote from said supports for guiding the conveying reach of an endless belt, each troughing roller assembly comprising a plurality of flexibly interconnected rollers, and means for connecting the end rollers of each assembly to the adjacent flexible strand comprising a hanger supported on said flexible strand, and a double articulated connection between said hanger and said troughing roller, whereby upon movement of an offcenter conveying reach thereacross, said assembly is automatically shiftable to a position to re-train said reach toward the center of said strands.

20. In a belt conveyor, a pair of flexible strands tensioned along generally parallel courses; a plurality of supporting means at intervals along said strands effective to maintain the strands at a predetermined spacing; said strands being transversely deflectable to vary the spacing therebetween at positions intermediate said supporting means within limits determined by the tensions in said strands; an articulated troughing roller assembly connected across said strands at each of said intermediate positions; each articulated roller assembly comprising a series of shafts, each having a roller rotatably journaled thereon and adapted to support the load-carrying reach of a conveyor belt, adjacent shafts being pivotally interconnected in end-to-end relationship for relative flexing movement about a pivotal axis running longitudinally of said strands, bracket means clamped to each of said strands at one of said intermediate positions, and swivel connections between said bracket means and the respective ends of said series of shafts for shifting said assembly in a plane parallel to the strands, responsive to movement of an offcenter conveying reach thereacross, to a position to re-train said reach toward the center of said strands.

21. In a belt conveyor, a pair of flexible strands tensioned along generally parallel courses; a plurality of supporting means at intervals along said strands effective to maintain the strands at a predetermined spacing at said intervals; said strands being transversely deflectable toward and away from one another at positions intermediate said supporting means within limits determined by the tension in said strands; an articulated troughing roller assembly connected across said strands at each of said intermediate positions; said roller assembly comprising a plurality of shafts freely pivotally interconnected on a pivotal axis parallel to said strands, the end shafts of said assembly being connected to said strands by freely movable double articulated connections permitting swinging of said roller assembly as a unit in a plane parallel to said strands; a roller rotatably journaled on each shaft; and an orbitally movable belt with its load-carrying reach adapted to run along and be supported on said rollers; whereby a suddenly increasing load on said belt is cushioned against impact by the cumulative flexing of the roller assemblies and of the strands at said intermediate positions where the roller assemblies are connected.

22. In a belt conveyor, a pair of flexible strands tensioned along generally parallel courses; supporting means effective to maintain the strands at a predetermined spacing at said supporting means; said strands being transversely deflectable to vary the spacing therebetween at positions remote from said supporting means within limits determined by the tension in said strands and the proximity of said supporting means; at least one roller assembly comprising a series of shafts each having a roller rotatably journaled thereon for supporting the load-carrying reach of a belt, adjacent shafts being pivotally interconnected in end-to-end relationship for articulating movement about a pivotal axis running longitudinally of the belt; connecting means on each of said strands at said position remote from the supporting means forming a connection between said strand and the respective end of said series of shafts including a double pivotal link pivotable about spaced parallel axes normal to a plane including the adjacent strand thereby enabling the ends of said roller assembly to shift forward and backward incidental to maintaining said load-carrying reach centered.

23. In a belt conveyor, a pair of laterally spaced flexible strands, support means for said strands including means holding each of said strands against rotation relative to said support means, an elongated troughing roller assembly being transversely flexible along the length thereof and extending transversely between said strands for supporting the conveying reach of a conveyor belt, said troughing roller assembly being spaced along said strands from said support means to provide twistable lengths of said strands between said support means and said troughing roller assembly, and a clamped connection between each of said flexible strands and a corresponding end of said roller assembly, whereby downward swinging movement of each end of said roller assembly about the respective strand is resisted by twisting of one of said twistable lengths of strands to thereby limit the transverse flexing movement of said troughing roller assembly so the load on said troughing roller assembly is supported at least in part by the torsional resistance of said flexible strands.

24. In a belt conveyor, a pair of laterally spaced flexible strands, support means for said strands including means clamping said strands against relative rotation; an elongated troughing roller assembly being transversely flexible along the length thereof and extending transversely between and attached to said strands for supporting the conveying reach of a conveyor belt; said troughing roller assembly being spaced along said strands from said support means to provide twistable lengths of strands between said support means and said troughing roller assembly; said roller assembly including a pair of end lever members each having a portion clamped to respective ones of the strands against rotation relative thereto and having means interconnecting opposite portions of said lever members; whereby flexing of said roller assembly under transversely applied load is resisted by twisting of said twistable lengths of strand by said lever members so said load is supported at least in part by the torsional resistance of said flexible strands.

25. In a belt conveyor, a pair of laterally spaced flexible strands, support means for said strands; first and second troughing roller assemblies extending transversely between and attached to said strands for supporting the conveying reach of a conveyor belt; each of said troughing roller assemblies being transversely flexible along the length thereof; said roller assemblies being spaced from each other along each of said strands to provide a twistable length of each strand therebetween; each roller assembly including end portions, each of said end portions being clamped to one of the strands against rotation relative thereto; whereby flexing of the first assembly under a coming load on the belt swings the end portions of the first assembly in directions to twist said twistable lengths of strand to swing the end portions of the second assembly in directions to increase the troughing volume and sidewall retaining angle of the belt at said second assembly before the load reaches it.

26. In a belt conveyor, a pair of laterally spaced flexible strands, support means for said strands including means clamping said strands against relative rotation; first and second troughing roller assemblies extending transversely between and attached to said strands for supporting the conveying reach of a conveyor belt; each of said troughing roller assemblies being transversely flexible along the length thereof; said roller assemblies being spaced from each other along each of said strands to provide a first twistable length of each strand between said roller assemblies; said first troughing roller assembly being spaced along said strands from said support means to provide a second twistable length of each strand between said roller assembly and said support means; each roller assembly including end portions clamped respectively to said strands against rotation relative thereto; whereby flexing of the first roller assembly under a coming load on the belt swings the end portions of the first roller assembly in directions to twist said first twistable lengths of strands to swing the end portions of the second assembly in directions to increase the belt troughing volume and belt sidewall retaining angle of the second assembly before the load reaches it; and whereby further flexing of the first roller assembly under load on the belt swings the end portions of the first roller assembly in directions to twist said second twistable lengths of strands to support the load on the belt at least in part by the torsional resistance of said strands.

27. In a belt conveyor, a pair of laterally spaced, substantially horizontal, flexible strands, at least one elongated troughing roller assembly extending transversely between said strands for supporting the conveying reach of a conveyor belt, said roller assembly being flexible for substantially vertical flexible movement, and a connection between each of said flexible strands and the respective end of said roller assembly at locations where said strands are transversely movable toward and away from one another, said connections restraining swinging movement in a substantial vertical plane of each end of said roller assembly relative to the respective strand to which it is connected but permitting relatively greater relative movement therebetween in a substantially horizontal plane whereby a load on said roller assembly is supported at least in part by the torsional resistance of said flexible strands while said roller assembly is free to shift in said substantially horizontal plane to automatically maintain said belt centered thereon.

28. In a belt conveyor, a pair of flexible strands trained along generally parallel horizontal courses; a plurality of pairs of supporting means spaced at intervals along said strands effective to maintain the strands at a predetermined spacing at each supporting means and including means clamping said strands against rotation; said strands being transversely deflectable at positions intermediate said supporting means within limits determined by the tension in said strands and the spacing of said supporting means along said strands; articulated troughing roller assemblies connected across said strands at said intermediate positions; each troughing roller assembly being spaced along said strands from a corresponding supporting means to provide a twistable length of strand therebetween; each roller assembly comprising a plurality of shafts, each having a roller rotatably journaled thereon for supporting the load-carrying reach of a belt, adjacent shafts in each assembly being freely pivotally interconnected in end-to-end relationship for up and down flexing movement about a substantially horizontal pivotal axis running longitudinally of the belt, each of said shafts on the ends of said assembly constituting a cantilever member clamped to the strand to torsionally strain the respective strand upon vertical flexing movement of the roller assembly; whereby flexing of said roller assemblies under belt load is resisted by twisting of said twistable lengths of strands so the beltload is supported and impact is absorbed at least in part by the torsional resistance of said flexible strands.

29. A troughing roller assembly comprising a plurality of rollers, means interconnecting said rollers for individual relative movement of each roller in relation to each other in one plane and for shifting said rollers as a unit in another plane which is disposed substantially normal to said one plane and which another plane includes the longitudinal axis of said plurality of rollers, and connecting means connecting a mounting means to each end of said assembly, said connecting means enabling the unitary shifting of said assembly in said another plane relative to said mounting means whereby said roller assembly would have a self-training effect on a belt passing over it in a direction substantially parallel to said another plane by the unitary shifting of the roller assembly.

30. A troughing roller assembly comprising a plurality of rollers, means interconnecting said rollers for flexing movement thereof in a substantially vertical direction and for shifting movement thereof as a unit in a substantially horizontal direction, a bracket at each end of the roller assembly, and a connection between each bracket and an end of said roller assembly enabling the shifting movement of the rollers as a unit relative to the bracket whereby said roller assembly would have a self training effect on a belt passing over it by the shifting of the ends of the roller assembly.

31. A troughing roller assembly according to claim 30 in which each connection includes a horizontal swingable link freely pivotally connected, respectively to the corresponding bracket and to the corresponding end of the roller assembly.

32. A troughing roller assembly comprising a plurality of roller-supporting members freely articulately interconnected for flexing movement relative to one another in a substantially vertical direction and for shifting movement as a unit in a substantially horizontal direction, a bracket at each end of the roller assembly, and a connection between each bracket and one of said roller-supporting members at an end of the roller assembly enabling shifting of said end relative to the respective bracket in a horizontal direction but restraining said relative movement of the rollers therebetween in the vertical direction, whereby said roller assembly would have a self-training effect by the horizontal shifting of the ends of the roller assembly in response to an off-center condition of a belt passing thereover which would be supported at least in part by restrained movement of the ends of the roller assembly relative to the respective brackets in the vertical direction.

33. A troughing roller assembly comprising a series of elongated roller-supporting members arranged in end-to-end relationship along a longitudinal axis; a bracket at each end of said series of members; said members having an interconnection between adjacent members providing for freely pivotal relative movement of said members about a first transverse axis which transversely intersects said longitudinal axis, said interconnection being relatively rigid against relative movement in the direction of said first transverse axis; each of said brackets having a connection with a respective end member of said series providing for freely pivotal movement of said end member relative to said bracket about a second transverse axis which transversely intersects said longitudinal axis, said connection being relatively rigid against relative movement in the direction of said second transverse axis, said first and second transverse axes intersecting said longitudinal axis in directions which are substantially at right angles to one another whereby a belt passing over said roller-supporting assembly in a direction substantially parallel to the first transverse axis would be supported at least in part in the direction of the second transverse axes by the relative rigid connection between the brackets and the respective end members of the series.

34. A troughing roller assembly comprising a series of elongated roller-supporting members arranged in end-to-end relationship along a longitudinal axis; a bracket at each end of said series of members; an interconnection between adjacent members providing for freely pivotal relative movement of said members about a first transverse axis which transversely intersects said longitudinal axis, said interconnection being relatively rigid against relative movement in the direction of said first transverse axis; each of said brackets having a double pivotal connection with a respective end member of said series providing for freely shiftable movement of said end member relative to said bracket about spaced, parallel second and third transverse axes respectively which transversely intersect said longitudinal axis, said connection being relatively rigid against relative movement in the direction of said second and third transverse axes; and said first axis intersecting said longitudinal axis in a direction which is substantially at right angles to the direction of the second and third axes.

35. A troughing roller assembly comprising a series of elongated roller-supporting members arranged in end-to-end relationship along a longitudinal axis; a bracket at each end of said series of members; a double pivotal interconnection between adjacent members providing for freely pivotal relative movement of said members about spaced, parallel first and second transverse axes which transversely intersect said longitudinal axis, said interconnection being relatively rigid against relative movement in the direction of said first and second transverse axes; each of said brackets having a double pivotal connection with a respective end member of said series providing for freely shiftable movement of said end member relative to said bracket about spaced, parallel third and fourth transverse axes respectively which transversely intersect said longitudinal axis, said connection being relatively rigid against relative movement in the drection of said third and fourth transverse axes; and said first and second axes intersecting said longitudinal axis in a direction which is substantially at right angles to the direction of the third and fourth axes.

36. A troughing roller assembly comprising a series of roller elements, a mounting bracket at each end of said series, said elements being interconnected end to end for individual flexible movement in one direction transverse to a line intersecting both of said mounting brackets, and free swinging double pivoted connecting means between each of said ends and the corresponding mounting bracket for free shifting movement of each said end relative to the respective mounting bracket in another direction which is transverse to said one direction and also transverse to said line intersecting both of said mounting brackets whereby said roller assembly would have a self-training effect on a belt passing over it in a direction substantially parallel to said another direction by the shifting movement of the ends relative to the respective mounting brackets.

37. In a conveyor providing an uneven path of load movement, a supporting structure adapted to tranquillize a load as it is conveyed along said path and comprising transversely flexible strand means fixed at the opposite ends thereof, two spaced strand supports supporting said strand means intermediate the ends thereof, elongated transversely flexible load supporting means extending transversely of said strand means, said load supporting means being transversely flexible in relation to said strand means, and connection means connecting said load supporting means to said strand means at a position between said strand supports where said strand means is flexible and transmitting some of the flexing effect of a load on the load supporting means to said strand means to flex the same transversely for moderating an uneven path of a load movement as a load is moved relative to and along said supporting structure.

38. In a conveyor, a supporting structure according to claim 37 wherein said transversely flexible strand means comprises a pair of spaced, substantially parallel strands with said connection means connecting the opposite ends of said load supporting means to said strands, respectively.

39. In a conveyor, a supporting structure according to claim 38 wherein said elongated load supporting means comprises a series of rollers arranged in end-to-end relationship, each having a coaxial supporting member extending from each of its ends about which it is rotatable, and an interconnection between said members at the adjacent ends of said rollers which is flexible in a direction both transversely of said strand means and in an axial plane of said roller.

40. In a conveyor, a supporting structure according to claim 37 wherein a load carrying portion of a conveying belt is supported on said load supporting means for movement relative to and transversely of said load supporting means.

References Cited in the file of this patent

UNITED STATES PATENTS

| | | |
|---|---|---|
| 909,833 | Vrooman | Jan. 12, 1909 |
| 1,748,301 | McKinlay | Feb. 25, 1930 |
| 2,751,065 | Thomson | June 19, 1956 |

FOREIGN PATENTS

| | | |
|---|---|---|
| 105,141 | Great Britain | Apr. 5, 1917 |
| 890,337 | France | Nov. 2, 1943 |
| 744,915 | Germany | Jan. 29, 1944 |